(12) United States Patent
Cowley et al.

(10) Patent No.: US 7,266,350 B2
(45) Date of Patent: Sep. 4, 2007

(54) RADIO FREQUENCY TUNER

(75) Inventors: Nicholas Paul Cowley, Wroughton (GB); Richard Crossley, Swindon (GB)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 10/688,556

(22) Filed: Oct. 16, 2003

(65) Prior Publication Data

US 2004/0132422 A1 Jul. 8, 2004

(30) Foreign Application Priority Data

Oct. 19, 2002 (GB) .................. 0224337.6

(51) Int. Cl.
*H04B 1/04* (2006.01)
*H04B 17/00* (2006.01)
*H04Q 11/12* (2006.01)

(52) U.S. Cl. .................. 455/127.4; 455/114.2; 455/226.1; 455/278.1

(58) Field of Classification Search ................ 455/324, 455/323, 296, 302, 550.1, 553.1, 114.2, 115.3, 455/134, 135, 141, 226.1, 226.2, 255, 278.1, 455/127.4
See application file for complete search history.

(56) References Cited

U.S. PATENT DOCUMENTS

| | | | |
|---|---|---|---|
| 5,822,704 A | 10/1998 | Ishii | |
| 5,937,341 A * | 8/1999 | Suominen | 455/324 |
| 6,147,713 A | 11/2000 | Robbins et al. | |
| 6,377,782 B1 * | 4/2002 | Bishop et al. | 455/3.01 |
| 6,724,439 B1 * | 4/2004 | Horwitz | 348/724 |
| 6,785,529 B2 * | 8/2004 | Ciccarelli et al. | 455/324 |

FOREIGN PATENT DOCUMENTS

| | | |
|---|---|---|
| EP | 0729230 A1 | 8/1996 |
| EP | 1085665 A2 | 3/2001 |
| GB | 2215945 A | 9/1989 |
| WO | WO 00/22735 A1 | 4/2000 |

OTHER PUBLICATIONS

Patents Act 1977: Examination Report under Section 18(3) for United Kingdom Counterpart Application No. GB 0224337.6, 2 pgs. (Apr. 29, 2005).
Patents Act 1977: Search Report under Section 17 for United Kingdom Counterpart Application No. GB 0224337.6 (Jun. 27, 2003).

* cited by examiner

*Primary Examiner*—Tony T. Nguyen
(74) *Attorney, Agent, or Firm*—Blakely, Sokoloff, Taylor & Zafman LLP

(57) ABSTRACT

A tuner for analogically and digitally modulated signals comprises a single tuner arrangement for converting any selected analog or digital channel to baseband or zero IF quadrature signals. Simple analog low pass filtering is applied before conversion in an ADC to the digital domain. A digital signal processor performs channel filtering and signal correction and supplies a signal to a digital demodulator. The processed digital signals are also supplied to a digital remodulator and DAC.

12 Claims, 2 Drawing Sheets

RADIO FREQUENCY TUNER

TECHNICAL FEILD

The present invention relates to a radio frequency tuner for analogically and digitally modulated signals. Such a tuner may be used to receive terrestrial broadcast signals and may also be used for receiving signals from cable and satellite systems.

BACKGROUND

Many digital services are transmitted in parallel with analog services and this situation is likely to continue for some time. In many cases, the digital services do not necessarily offer duplicate data streams to the corresponding analog services. An example of such an arrangement is where national services may be replicated in those digital and analog services but local programming may only be broadcast on the analog services. It is therefore a common requirement in receivers that means for both digital and analog reception have to be provided.

FIG. 1 of the accompanying drawings illustrates an example of a known type of "dual standard" tuner for receiving terrestrial digital and analog services. An antenna input 1 is connected to a power splitter 2, which is required to buffer the input spectrum to an analog path 3 and a digital path 8 while adding minimum degradation to the signal quality. The analog path 3 comprises an analog tuner 4, which receives and down converts any selected channel to an output intermediate frequency (IF). The output of the analog tuner 4 is connected to a surface acoustic wave filter (SAWF) 5, whose function is to filter out the desired channel and possibly isolate the video and audio information contained within the analog channel. The output of the filter 5 is connected to an analog demodulator 6 for demodulating the selected channel. The output of the demodulator 6 is connected to an output device illustrated as a common display means 7, such as a monitor.

The digital path 8 comprises a digital tuner 9, which down converts the desired channel to another intermediate frequency, which may be the same as or different from the intermediate frequency in the analog path 3. The output of the tuner 9 is connected to a surface acoustic wave filter 10, which filters out the desired channel and provides attenuation to adjacent interfering channels. The output of the filter 10 is supplied to an IF amplifier 11, which compensates for the insertion loss of the filter 10. The output of the amplifier 11 is supplied to a further surface acoustic wave filter 12, which provides further attenuation to the adjacent interfering channels. The output of the filter 12 is connected to a digital demodulator whose output is connected to the common display means 7. The demodulator 13 demodulates the received channel and contains an analog-digital converter (ADC). The demodulator may provide further gain.

In the arrangement shown in FIG. 1, two different tuners 4 and 9 are necessary because of differences in the performance requirements for digital and analog channels. For example, the digital tuner 9 generally requires a higher signal handling capability in order to cope with relatively high amplitude adjacent interfering analog signals. Also, the digital tuner 9 is generally required to have a superior local oscillator noise performance in order to meet the requirements of digital demodulation. Further, the digital tuner 9 may be required to cover only a portion of the band covered by the analog tuner 4.

The presence of the power splitter 2 inevitably degrades the signal quality to a greater or lesser extent. For example, the power splitter 2 is required to handle a relatively large input signal energy and intermodulation products generated within the splitter 2 degrade the received signals. Also, the power splitter 2 contributes its own thermal noise to the received spectrum and so degrades the noise performance of the tuner. Further, two independent tuners are required together with various surface acoustic wave filters and this adds to the size and cost of such an arrangement.

U.S. Pat. No. 6,147,713 discloses a multi standard television tuner capable of receiving analog or digital modulated signals. A tuner selects and converts a channel for reception to a conventional intermediate frequency, an example of which is given as 9 MHz. This is converted to digital in an analog-digital converter and the digital video signal is subjected to Nyquist lowpass filtering followed by decimation followed by further lowpass filtering.

U.S. Pat. No. 5,822,704 discloses a mobile telephone capable of receiving analog and digital standard signals. The telephone comprises a tuner which converts the selected channel to a conventional intermediate frequency and this is followed by quadrature detection. This detection process performs down-conversion to baseband. The resulting I and Q signals are converted to digital and further processed.

SUMMARY

According to the invention, there is provided a radio frequency tuner for analogically and digitally modulated signals, comprising a tuner arrangement for converting any selected analog or digital channel to baseband or zero intermediate frequency, analog quadrature signals, a dual analog-digital converter for converting the analog quadrature signals to digital quadrature signals, and a digital signal processor for processing said digital quadrature signals, said processing including performing channel filtering to pass said selected channel and substantially to reject other channel signals.

The tuner may comprise a remodulator for converting an analog channel processed by the processor to an analogically modulated signal at a predetermined intermediate frequency. The intermediate frequency may be a non-zero intermediate frequency. The remodulator may comprise a digital remodulator and a digital-analog converter.

The processor may be arranged to correct quadrature conversion errors in the tuner arrangement.

The tuner may comprise a dual analog anti-alias filter between the tuner arrangement and the analog-digital converter. The anti-alias filter may be a low pass filter. The dual anti-alias filter may be the only filtering between the tuner arrangement and the analog-digital converter.

The processor may have selectable filtering characteristics for different modulation standards.

The tuner may comprise a digital demodulator connected to the first output.

The tuner may comprise an analog demodulator connected to the second output.

The tuner may comprise a single monolithic integrated circuit.

It is thus possible to provide a tuner for analog and digital signals requiring only a single tuner arrangement. Also, it is not necessary to use surface acoustic wave filters. In particular, such filters can be replaced by simple low pass filters in the analog domain and most channel filtering can be performed in the digital domain. The absence of surface acoustic wave filters eliminates the requirement for compensating gain stages. The system power, cost and size such as circuit board area may therefore all be substantially reduced. Further, it is unnecessary to provide a power splitting function at the input so that the degrading affects on signal-to-noise and system-to-modulation performance can be avoided.

BRIEF DESCRIPTION OF DRAWINGS

Like reference numerals refer to like parts throughout the drawings.

DETAILED DESCRIPTION

Figure 1:
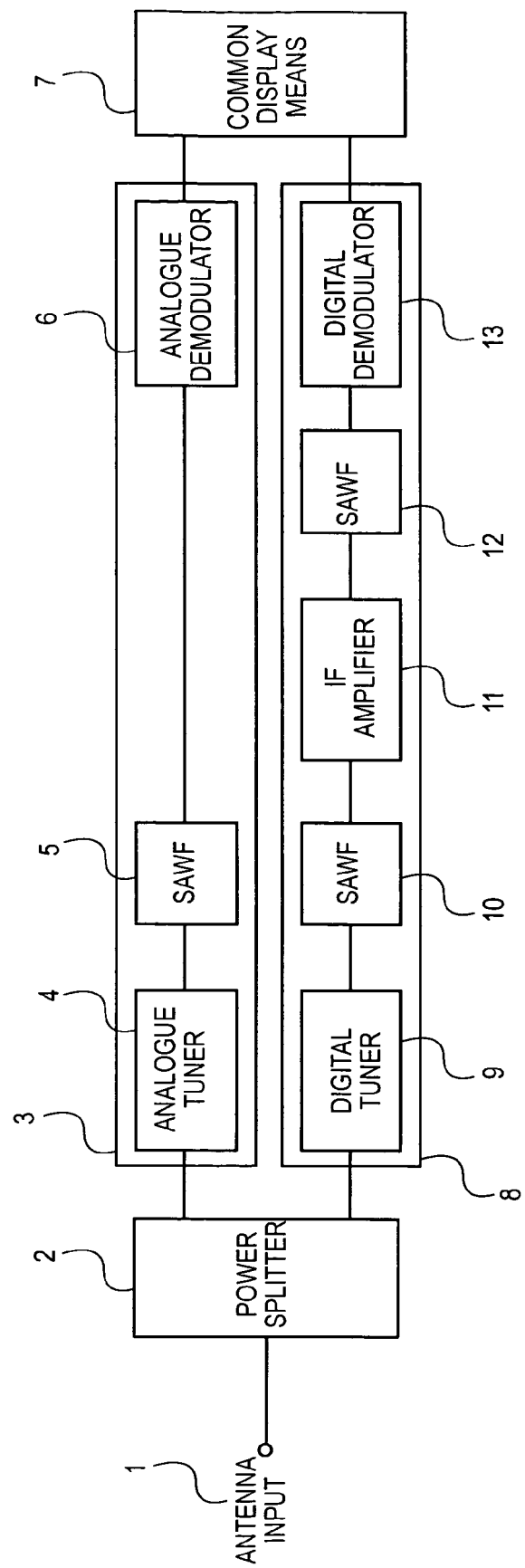
FIG. 1 is a block circuit diagram of a known type of multi-mode tuner for terrestrial signals.
Figure 2:
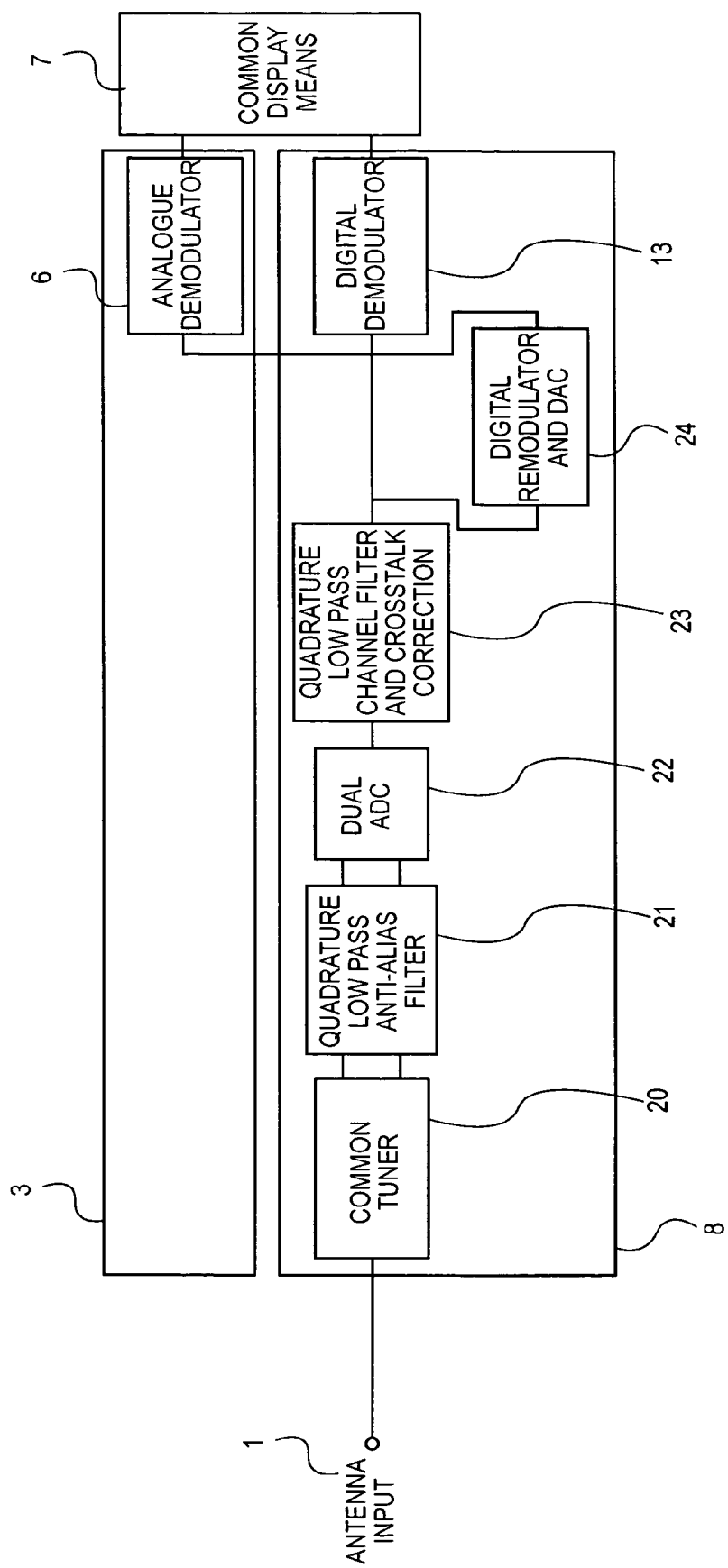
FIG. 2 is a block circuit diagram of a tuner constituting an embodiment of the invention.

The tuner shown in FIG. 2 comprises an antenna input 1 connected to a digital path 8 but not connected to an analog path 3 so that no power splitting is required at the input of the tuner. The digital path 8 comprises a common tuner 20, which performs quadrature down conversion of any selected analog or digital channel to zero intermediate frequency or baseband. The I and Q outputs of the common tuner 20 are connected to a quadrature low pass anti-alias filter 21, which filters out the desired channel and provides initial attenuation of adjacent channels and channels at aliasing frequencies. The outputs of the filter 21 are connected to a dual analog-digital converter (ADC) 22, which digitises the baseband quadrature signals.

The digital signals from the converter 22 are supplied to a digital signal processor 23. The processor 23 corrects for quadrature conversion errors introduced, for example, by the common tuner 20. The processor 23 also corrects for imbalances in the filter 21 and may provide appropriate feedback signals to the filter 21. The processor 23 also performs channel filtering in the digital domain. The channel filtering may have different selectable characteristics so as to adapt the filtering to the needs of the modulation standard of the channel being received.

The output of the processor 23 is connected to a digital demodulator 13, whose output is connected to a common display means 7. The output of the processor 23 is also connected to a digital remodulator and digital-analog converter (DAC) 24. The remodulator receives the filtered channel information from the processor 23 and performs digital quadrature modulation to an intermediate frequency compatible with analog demodulation. The remodulated signal is converted to an analog signal and may be subjected to some simple "loose" output filtering to remove digital artefacts. The remodulated analog signal is supplied to an analog demodulator 6, whose output is supplied to the common display means 7. Thus, the analog path 3 comprises only the analog demodulator 6.

As an alternative, the remodulator and DAC 24 and the analog demodulator 6 may be replaced by a demodulator which operates in the digital domain to recover the analog signal and which is connected directly to an output of the processor 23.

It is thus possible to provide a system which substantially simplifies the requirements for mixed modulation receivers. A dual tuner arrangement is replaced with a single tuner and all surface acoustic wave filters can be eliminated from the system. The filtering is replaced by simple low pass filters in the analog domain and these may be integrated onto a monolithic integrated circuit containing the tuner so as to reduce system size and cost. Channel filtering is largely performed in the digital domain and does not require extra resources as such filtering is generally already present in conventional arrangements, for example within digital demodulators.

The elimination of surface acoustic wave filters removes the requirement for compensating gain stages so that power consumption can be reduced and less circuit board area is required, thus leading to reduced costs. The use of a common tuner for all types of signals removes the requirement for power splitting at the input of the tuner so that the degrading effects of such power splitting on noise and intermodulation performance can be avoided.

What is claimed is:

1. A radio frequency tuner for analogically and digitally modulated signals, comprising
   a tuner arrangement for converting any selected one of analog and digital channels to one of baseband and zero intermediate frequency analog quadrature signals,
   a low pass filter for filtering out the selected channel from said analog quadrature signals, the low pass filer attenuating a first channel adjacent to the selected channel, the low pass filter attenuating a second channel at an aliasing frequency of the selected channel, the low pass filter correcting imbalances based on a feedback signal, and the low pass filter being a quadrature anti-alias filter,
   a dual analog-digital converter for converting said analog quadrature signals to digital quadrature signals, and
   a digital signal processor coupled with the low pass filter for processing said digital quadrature signals, said processing including performing channel filtering to pass said selected channel and substantially to reject other channel signals, said processor providing the feedback signal to the low pass filter.

2. A tuner as claimed in claim 1, comprising a remodulator for converting an analog channel processed by said processor to an analogically modulated signal at a predetermined intermediate frequency.

3. A tuner as claimed in claim 2, in which said predetermined intermediate frequency is a non-zero intermediate frequency.

4. A tuner as claimed in claim 2, in which said remodulator comprises a digital remodulator and a digital-analog converter.

5. A tuner as claimed in claim 1, in which said processor is arranged to correct quadrature conversion errors in said tuner arrangement.

6. A tuner as claimed in claim 1, comprising a dual analog anti-alias filter between said tuner arrangement and said analog-digital converter.

7. A tuner as claimed in claim 6, in which said anti-alias filter is a low pass filter.

8. A tuner as claimed in claim 6, in which said dual anti-alias filter is the only filtering between said tuner arrangement and said analog-digital converter.

9. A tuner as claimed in claim 1, in which said processor has selectable filtering characteristics for different modulation standards.

10. A tuner as claimed in claim 1, comprising a digital demodulator connected to said processor.

11. A tuner as claimed in claim 1, comprising an analog demodulator.

12. A tuner as claimed in claim 1, comprising a single monolithic integrated circuit.

* * * * *